United States Patent [19]

Ota

[11] Patent Number: 4,913,099

[45] Date of Patent: Apr. 3, 1990

[54] FUEL INJECTION CONTROL APPARATUS

[75] Inventor: Tadaki Ota, Fujisawa, Japan

[73] Assignee: Nissan Motor Co., Ltd., Yokohama, Japan

[21] Appl. No.: 329,223

[22] Filed: Mar. 27, 1989

[30] Foreign Application Priority Data

Mar. 29, 1988 [JP] Japan .................... 63-73447

[51] Int. Cl.⁴ .................................. F02D 41/04
[52] U.S. Cl. ............................ 123/478; 123/1 A; 123/494
[58] Field of Search ............... 123/478, 1 A, 494, 480

[56] References Cited

U.S. PATENT DOCUMENTS

| | | | |
|---|---|---|---|
| 4,519,341 | 5/1985 | McGarr ........................... | 123/1 A |
| 4,635,608 | 1/1987 | Carroll ........................... | 123/1 A |
| 4,646,691 | 3/1987 | Kiyota et al. ................... | 123/1 A |
| 4,706,630 | 11/1987 | Wineland et al. .............. | 123/1 A |
| 4,770,129 | 9/1988 | Miyata et al. .................. | 123/494 |
| 4,841,938 | 6/1989 | Weibler et al. ................. | 123/494 |

FOREIGN PATENT DOCUMENTS 59-29733  2/1984  Japan .................... 123/1 A

Primary Examiner—Raymond A. Neill
Attorney, Agent, or Firm—Lowe, Price, LeBlanc, Becker & Shur

[57] ABSTRACT

An apparatus for controlling fuel delivery to an internal combustion engine having a plurality of cylinders each having an individual fuel injector. The apparatus comprises a sensor sensitive to an alcohol concentration of the fuel to be delivered to the engine for producing an alcohol concentration signal indicative of a sensed alcohol concentration. The apparatus also includes a control unit responsive to the alcohol concentration signal for controlling the duration of fuel injection from each of the fuel injectors to the corresponding cylinder. The control unit calculates a first time at which fuel injection to the corresponding cylinder is terminated and a second time at which fuel injection to the corresponding cylinder is initiated to ensure that the fuel injection will be terminated at the first time. The first time is varied according to the alcohol concentration.

4 Claims, 5 Drawing Sheets

FUEL INJECTION CONTROL APPARATUS

BACKGROUND OF THE INVENTION

This invention relates to a fuel injection control apparatus for use with an internal combustion engine operable on a gasoline/alcohol fuel blend and, more particularly, to such a fuel injection control apparatus for adjusting the time at which fuel injection is initiated to ensure that the fuel injection is terminated at a particular time.

For example, Japanese Patent Kokai No. 59-29733 discloses a fuel injection control apparatus which adjusts the time at which fuel injection from a particular fuel injector is initiated in a manner to ensure that the fuel injection is terminated at a particular time. The time at which fuel injection is terminated is set to a fixed crankshaft angular position near the beginning of the intake stroke of the corresponding piston in order to render the air-fuel ratio lean during transitional engine operation and obtain fuel economy during steady engine operation. The amount of fuel metered to the corresponding cylinder, this being determined by the duration of fuel injection from the particular fuel injector, is calculated based upon various conditions of the engine that are sensed during its operation. These sensed conditions include engine load, engine speed, cylinder-head coolant temperature, etc. The calculated duration of fuel injection is converted into the corresponding number of crankshaft degrees. The time at which the fuel injection is initiated is set to a crankshaft angular position by substracting the crankshaft angles from the crankshaft angular position at which fuel injection is terminated. Fuel injection from the particular fuel injector is initiated when the engine crankshaft reaches the angular position set for the time at which fuel injection is initiated. For this purpose, crankshaft position pulses each corresponding to two degrees of rotation of the engine crankshaft is counted after the engine crankshaft reaches a reference position provided for the particular cylinder.

In recent years, alcohol has been used in automotive vehicles either pure or blended with gasoline. The amount of fuel metered to the engine is controlled based upon the alcohol concentration of the fuel on which the engine is operating. The greater the percentage of the alcohol fuel contained in the gasoline/alcohol fuel blend, the smaller the stoichiometric air/fuel ratio and the greater the amount of gasoline/alcohol fuel blend that must be delivered to the engine to maintain the desired optimum air/fuel ratio. For example, when the gasoline/alcohol fuel blend has an alcohol concentration of 85 volumetric percentages, the required amount of gasoline/alcohol fuel blend is substantially twice the required amount of straight or 100% gasoline fuel for the same amount of air. If the time at which fuel injection is terminated is set to a crankshaft angular position, for example, near the beginning of the intake stroke of the piston, suitable for straight gasoline fuel, the time at which fuel injection is initiated will be set to a crankshaft angular position before the reference position, resulting in improper air/fuel metering control when the gasoline/alcohol fuel blend has a high alcohol concentrations. This is true particularly when the engine is operating at high-load and/or high-speed conditions. If the time at which fuel injection is terminated is set to a crankshaft angular position, for example, near the end of the intake stroke of the piston, suitable for gasoline-/alcohol fuel blend having a high alcohol concentration, appropriate fuel combustion cannot be obtained when the engine is operating on gasoline/alcohol fuel blend having a low alcohol concentration.

This dilemma may be overcome by increasing the amount of fuel injected to the engine per unit time so as to decrease the required time interval of fuel injection. However, this requires the use of fuel injectors having a slow response time and a limited service life resulting from deposite problems when the fuel has a high alcohol concentration.

SUMMARY OF THE INVENTION

It is a main object of the invention to provide a fuel injection control apparatus which can have good air/fuel ratio control for internal combustion engines operable on a gasoline/alcohol fuel blend over the whole range of the alcohol concentration of the fuel.

There is provided, in accordance with the invention, an apparatus for controlling fuel delivery to an internal combustion engine having a plurality of cylinders each having an individual fuel injector. The apparatus comprises means sensitive to an alcohol cóncentration of the fuel to be delivered to the engine for producing an alcohol concentration signal indicative of a sensed alcohol concentration, means sensitive to engine speed for producing an engine speed signal indicative of a sensed engine speed, and means sensitive to engine load for producing an engine load signal indicative of a sensed engine load. The apparatus also includes a control unit responsive to the alcohol concentration signal, the engine speed signal and the engine load signal for controlling the duration of fuel injection from each of the fuel injectors to the corresponding cylinder. The control unit includes means for calculating a first time at which fuel injection to the corresponding cylinder is terminated, means for calculating a second time at which fuel injection to the corresponding cylinder is initiated to ensure that the fuel injection will be terminated at the first time, and means for varying the first time according to the alcohol concentration. The control unit is coupled to means for initiating fuel injection to the corresponding cylinder at the second time and terminating the fuel injection to the corresponding cylinder at the first time.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
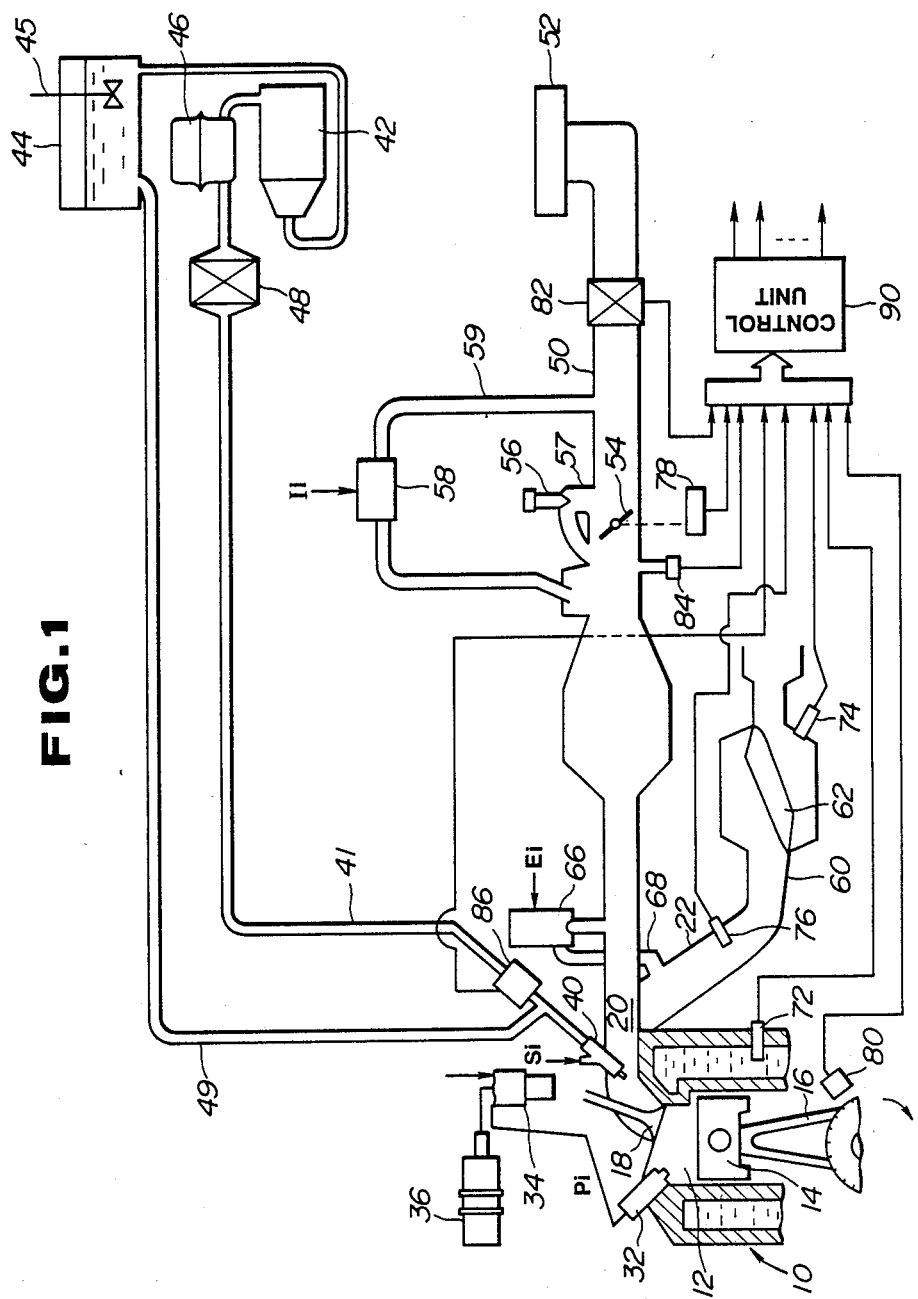
FIG. 1 is a schematic diagram showing one embodiment of a fuel injection control apparatus made in accordance with the invention.

With reference to the drawings, wherein like numerals refer to like parts in the several views, and in particular to FIG. 1, there is shown a schematic diagram of a fuel injection control apparatus embodying the invention. An internal combustion engine, generally designated by the numeral 10, for an automative vehicle includes a combustion chamber or cylinder 12. A piston 14 is mounted for reciprocal motion within the cylinder 12. A crankshaft 16 is supported for rotation within the engine 10 in response to reciprocation of the piston 14 within the cylinder 12.

An intake manifold 20 is connected with the cylinder 12 through an intake port with which an intake valve 18 is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from a distributor 34 connected to an ignition coil 36. An exhaust manifold 22 is connected with the cylinder 12 through an exhaust port with which an exhaust valve (not shown) is in cooperation for regulating the exit of combustion products, exhaust gases, from the cylinder 12 into the exhaust manifold 22. The intake and exhaust valves are driven through a suitable linkage with the crankshaft.

A fuel injector 40 is connected by a conduit 41 to a fuel pump 42 which is also connected to a fuel tank 44. The fuel pump 42 is electrically operated to maintain sufficient pressure. The fuel tank 44 contains a gasoline-alcohol fuel blend. The alcohol fuel may include methanol, ethanol, or methanol/ethanol blend. A device 45 is provided for stirring the gasoline-alcohol fuel blend to achieve a constant alcohol concentration in the fuel tank 44. A fuel pressure regulator 46 is connected to the fuel pump 42 and through a fuel filter 48 to the fuel injector 40. The pressure regulator 46 maintain the pressure differential across the fuel injector 40 at a constant level. This regulation is accomplished by a variation in the amount of excess fuel returned through the return conduit 49 to the fuel tank 44. The fuel injector 40 opens to inject fuel into the intake manifold 12 when it is energized by the presence of electrical current Si. The length of the electrical pulse, that is, the pulse-width, applied to the fuel injector 40 determines the length of time the fuel injector opens and, thus, determines the amount of fuel injected into the intake manifold 20.

Air to the engine 10 is supplied through an air cleaner 52 into an induction passage 50. The amount of air permitted to enter the combustion chamber through the intake manifold 20 is controlled by a butterfly throttle valve 54 located within the induction passage 50. The throttle valve 54 is connected by a mechanical linkage to an accelerator pedal (not shown). The degree to which the accelerator pedal is depressed controls the degree of rotation of the throttle valve 54. The accelerator pedal is manually controlled by the operator of the engine control system. An idle adjustment screw 56 is provided to control the amount of air introduced into the induction passage 50 through a passage 57 bypassing the throttle valve 54 when the engine is idling. Similarly, a control valve 58 is provided to control the amount of air introduced into the induction passage 50 through a passage 59 bypassing the throttle valve 54. Preferably, the control valve 58 responds to a control pulse signal by opening the bypass passage 59 according to the duty ratio of the control pulse signal.

In the operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 32 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. Most of the exhaust gases are discharged to the atmosphere through an exahust system which conventionally includes an exhaust passage 60, a catalytic converter 62, a muffler and an exhaust pipe. Some of the exhaust gases, however, are recirculated to the combustion chamber 12 through an exhaust gas recirculation (EGR) system. The EGR system includes a valve 66 provided in an EGR passage 68. The valve 66 is controlled to determine the amount of exhaust gases recirculated through the EGR passage 68 to the combustion chamber 12.

Although the engine 10 as illustrated in FIG. 1 shows only one combustion chamber 12 formed by a cylinder and piston, it should be understood that the engine control system described herein is designated for use on a multi-cylinder engine. Thus, it should be understood that the number of the intake valves, exhaust valves, reciprocating pistons, spark plugs, and fuel injectors are the same as the number of the cylinders. Only one EGR valve 66, one throttle valve 54 and one ignition coil 36 are required for multi-cylinder applications.

The amount of fuel metered to the engine, this being determined by the width of the electrical pulses Si applied to the fuel injector 40, the fuel-injection timing, the EGR valve position, and the ignition-system spark timing are repetitively determined from calculations performed by a digital computer, these calculations being based upon various conditions of the engine that are sensed during its operation. These sensed conditions includes cylinder-head coolant temperature TW, catalytic converter temperature TC, exhaust oxygen content VS, throttle position CV, engine speed N, intake air flow QA, engine intake-manifold absolute-pressure PB, and alcohol concentration ALC. Thus, a cylinder-head coolant temperature sensor 72, a catalytic converter temperature sensor 75, an oxygen sensor 76, a throttle position sensor 78, a crankshaft position sensor 80, a flow meter 82, an intake-manifold absolute-pressure sensor 84, and an alcohol concentration sensor 86 are connected to a control unit 90.

The cylinder-head coolant temperature sensor 72 preferably is mounted in the engine cooling system and comprises a thermistor connected in an electrical circuit capable of producing a coolant temperature signal in the form of a DC voltage having a variable level proportional to coolant temperature TW. The catalytic converter temperature sensor 74 senses a catalytic converter temperature and produces a catalytic converter temperature signal in the form of a DC voltage proportional to a sensed catalytic converter temperature TC. The oxygen sensor 76 monitors the oxygen content of the exhaust and it is effective to provide an oxygen content signal indicative of the air-fuel ratio VS at which the engine is operating. The throttle position sensor 78 is a potentiometer electrically connected in a voltage divider circuit for producing a throttle position signal in the form of a DC voltage proportional to throttle valve position CV. The crankshaft position sensor 80 produces a series of crankshaft position electrical pulses C1, each corresponding to two degrees of rotation of the engine crankshaft, of a repetition rate directly proportional to engine speed and a series of reference electrical pulses CA at a predetermined number of degrees before the top dead center position of each engine piston. The flow meter 82 is responsive to the air flow QA through the induction passage 50 to produce an intake airflow signal proportional thereto. The intake-manifold absolute-pressure sensor 84 preferably is a strain-gauge diaphragm-type absolute pressure transducer located in a position in the intake manifold wherein there is minimum exposure to transient pressure conditions. The intake-manifold absolute-pressure sensor 84 produces an intake-manifold absolute-pressure signal indicative of a sensed intake-manifold absolute-pressure PB. The alcohol concentration sensor 86 is located at a position suitable to sense an alcohol concentration ALC contained in the fuel delivered to the fuel injector 40 and it produces an alcohol concentration signal indicative of a sensed alcohol concentration ALC. The alcohol concentration sensor 86 may comprise a capacitive probe inserted in the conduit 41 connected to the fuel injector 40. The capacitive prove has a capacitance variable in dependence on the alcohol concentration of the fuel delivered to the fuel injector 40. The capacitive probe is connected to a circuit for producing a signal proportional to the probe capacitance.

The control unit 90 calculates the amount of fuel metered to each of the cylinders, this being determined by the time interval of fuel injection from the corresponding fuel injector. This calculation is made based upon various engine operating conditions including engine load, engine speed, cylinder-head coolant temperature, etc. The control unit 90 calculates a first time at which fuel injection is to be terminated based on the alcohol concentration of the fuel to be delivered to the engine. The control unit 90 calculates a second time at which the fuel injection is to be initiated by subtracting the calculated fuel injection time interval from the calculated first time so as to ensure that the fuel injection will be terminated at the first time.

Figure 2:
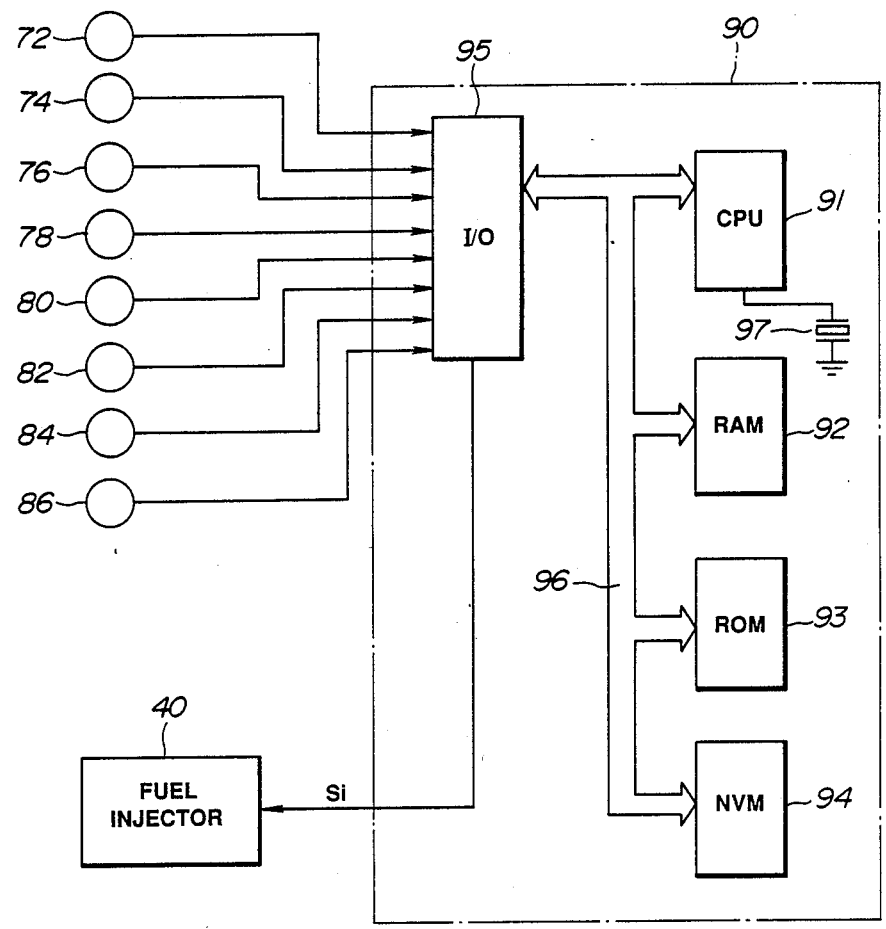
FIG. 2 is a schematic block diagram showing the detailed arrangement of the control unit used in the apparatus of FIG. 1.

Referring to FIG. 2, the control unit 90 employs a digital computer which includes a central processing unit (CPU) 91, a random access memory (RAM) 92, a read only memory (ROM) 93, a nonvolatile memory (NVM) 94, and an input/output control circuit 95. The central processing unit 91 communicates with the rest of the computer via data bus 96. A clock oscillator 97 is connected to the central processing unit 91. The input/output control circuit 95 includes an analog multiplexer, an analog-to-digital converter, a crankshaft position counter, a fuel injection control circuit, a spark timing control circuit, an EGR-valve position control circuit, and an idling speed control circuit. With the exception of engine speed, these engine conditions form the inputs to the analog multiplexer. The inputs to the analog multiplexer are, one by one, converted by the analog-to-digital converter into digiral form for application to the central processing unit 91. The A to D coversion process is initiated on command from the central processing unit 91 which selects the input channel to be converted. The crankshaft position counter counts the crankshaft position pulses to calculate an exsisting value for engine speed. The read only memory 93 contains the programs for operating the central processing unit 91 and further contains appropriate data in look-up tables used in calculating appropriate values for fuel-injection pulse-width, fuel-injection timing, ignition-system spark timing, EGR-valve position, and idling speed. The look-up data may be obtained experimentally or derived empirically. The central processing unit 91 may be programmed in a known manner to interpolate between the data at different entry points if desired.

Control words specifying desired fuel-injection pulse-width, fuel-injection timing, ignition-system spark timing, EGR-valve position, idling speed are periodically transferred by the central processing unit 91 to, respectively, the fuel injection control circuit, the spark timing control circuit, the EGR-valve position control circuit, and the idling speed control circuit. The fuel injection control circuit then sets the fuel-injection timing and the fuel-injection pulse-width according to the calculated value for them by converting the transferred information into a control signal Si which is applied to control the fuel injector 40. The sprak timing control circuit sets the spark timing by producing pulses Pi to the ignition system to cause an ignition spark to be produced at the time calculated by the computer. The EGR-valve position control circuit produces a signal Ei to make a change in the position of the EGR valve 66 if this is required. The idling speed control circuit produces a signal Ii to the control valve 58 which thereby controls the amount of air through the bypass passage 59 to adjust the engine speed at idle conditions. The digital computer is responsive to an interrupt signal to temporarily stop execution of the program control sequence (background job) and to start executing an interrupt routine for controlling the parameters during a specified operating condition.

Figure 3:
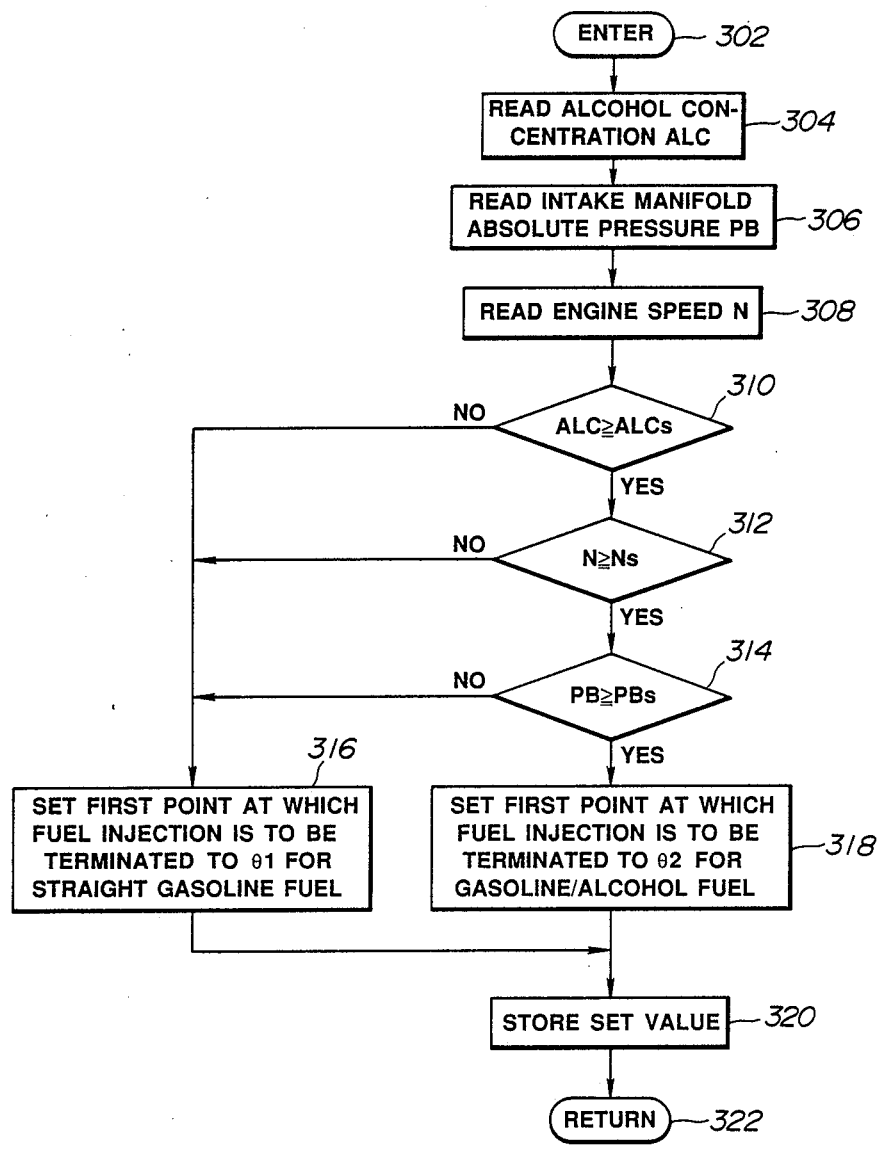
FIG. 3 is a flow diagram illustrating the programming of the digital computer as it is used to determine the time at which fuel injection is to be terminated.

FIG. 3 is a flow diagram illustrating the programming of the digital computer as it is used to determine the first point, in terms of crankshaft angular position, at which fuel injection is to be terminated by de-energization of a particular fuel injector 40. The computer program is entered at the point 302. Following this, the sensed conditions, alcohol concentration ALC, intake-manifold absolute-pressure PB and engine speed N, required for determining the first point at which fuel injection is to be terminated are read into the computer memory. Thus, at the point 304 in the program, the alcohol concentration signal is converted into digital form and read into the random access memory 92. Similarly, at the point 306 in the program, the intake-manifold absolute-pressure signal is converted to digital form and read into the random access memory 92. The engine speed N is calculated and read into the random access memory 92 at the point 308.

At the point 310 in the program, a determination is made as to whether or not the read value ALC for alcohol concentration is equal to or greater than a predetermined value ALCs, for example, 60% by volume. If the answer to this question is "yes", then the program proceeds to the point 312. If the fuel has a low alcohol concentration less than the predetermined value ALCs, then the program proceeds to the point 316 where the first point at which fuel injection is to be terminated is set to a first predetermined crankshaft angular position $\theta_1$, for example, near the beginning of the intake stroke of the corresponding piston, suitable for straight gasoline fuel. The reason for this is that the required amount of fuel is relatively small and the time interval during which fuel injection is required is relatively short when the fuel has a low alcohol concentration.

At the point 312 in the program, a determination is made as to whether or not the read value N for engine speed is equal to or less than a predetermined value Ns, for example, 4000 rpm. If the answer to this question is "yes", then the program proceeds to the point 314. If the engine is operating at a slow speed less than the predetermined value Ns, then the program proceeds to the point 316 where the first point at which fuel injection is to be terminated is set to the first predetermined crankshaft angular position $\theta_1$ suitable for straight gasoline fuel. The reason for this is that the time interval during which fuel injection can be performed is relatively long when the engine is operating at a low speed.

At the point 314 in the program, a determination is made as to whether or not the read value PB for intake-manifold absolute-pressure is equal to or greater than a predetermined value PBs, for example, 100 millimeters Hg. If the answer to this question is "yes", then the program proceeds to the point 318 where the first point at which fuel injection is to be terminated is set to a second predetermined crankshaft angular position $\theta_2$, for example, near the end of the intake stroke of the corresponding piston, suitable for gasoline/alcohol fuel blend. The second predetermined crankshaft angular position $\theta_2$ is retared with respect to the first predetermined crankshaft angular position $\theta_1$. If the intake-manifold absolute-pressure is less than the predetermined value PBs, then the program proceeds to the point 316 where the first point at which fuel injection is to be terminated is set to the first predetermined crankshaft angular position $\theta_2$ suitable for straight gasoline fuel. The reason for this is that the required amount of fuel is relatively small and the time interval during which fuel injection is required is relatively short when the engine load is small.

Upon completion of the step at the point 316 or 318, the program proceeds to the point 320 where the crankshaft angular position $\theta_1$ or $\theta_2$ set for the first point is stored into the random access memory 92. Following this, the program proceeds to the point 322 where the computer program is returned to the entry point 302 for the next cycle of execution of the computer program.

Although the first point at which fuel injection from a particular fuel injector is terminated is set selectively to one of first and second predetermined crankshaft angular positions, it should be understood that the control unit may be arranged to set the first point to one of three or more crankshaft angular positions. In addition, the set first point may be modified for cylinder-heat coolant temperature or other engine operating conditions.

Figure 4:
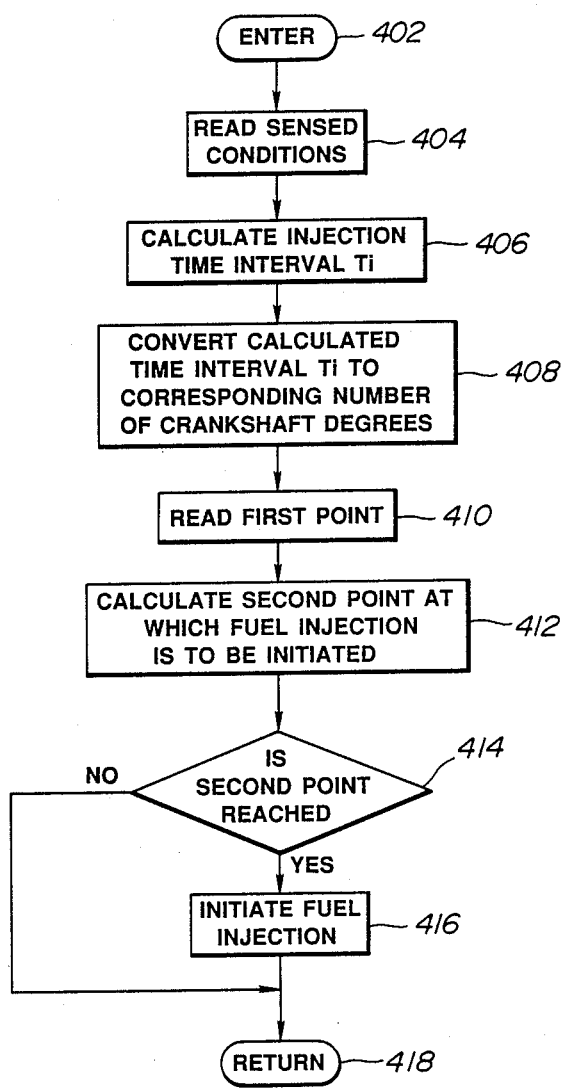
FIG. 4 is a flow diagram illustrating the programming of the digital computer as it is used to determine the time at which fuel injection is to be initiated.

FIG. 4 is a flow diagram illustrating the programming of the digital computer as it is used to initiate fuel injection in order to assure that fuel injection will be terminated at the crankshaft angular position set for the first point. The computer program is entered at the point 402. Following this, at the point 404, the sensed conditions, intake air flow QA, engine speed N, alcohol concentration ALC, and cylinder-head coolant temperature TW, required for determining the time interval Ti during which fuel injection is required are read into the random access memory 92.

At the point 406 in the program, the time interval Ti during which fuel injection is required is calculated by the central processing unit 91 from a relationship programmed into the computer. This relationship defines required time interval Ti as a function of intake air flow QA, engine speed N, alcohol concentration ALC and cylinder-head coolant temperature TW. At the point 408 in the program, the central processing unit 91 converts the calculated time interval Ti to the corresponding number of crankshaft degrees. This conversion is made based upon the read engine speed N. At the point 410, the central processing unit 91 reads the crankshaft angular position set for the first point and stored at the point 320 in the program of FIG. 2. At the point 412, the central processing unit 91 calculates a second point, in terms of crankshaft angular position, at which fuel injection is initiated to assure that fuel injection will be terminated at the crankshaft angular position set for the first point. This calculation is made by subtracting the calculated number of crankshaft degrees from the crankshaft angular position set for the first point.

Figure 5:
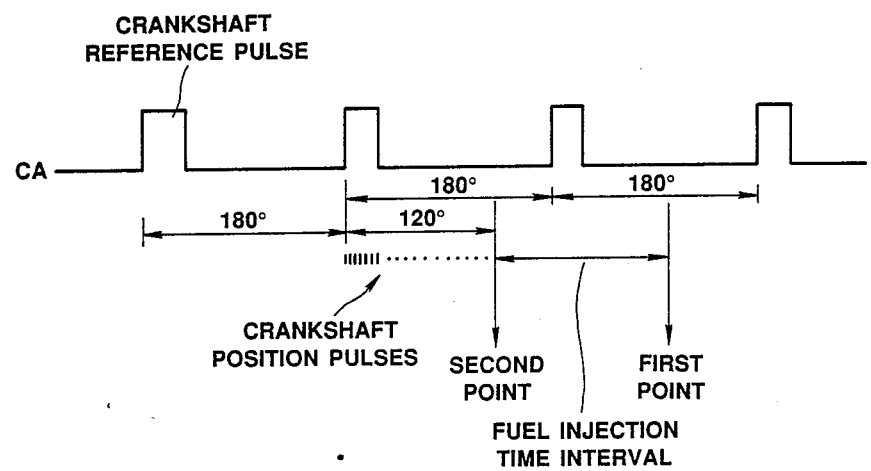
FIG. 5 is a diagram used in explaining the manner in which fuel injection is initiated for a particular cylinder.

At the point 414 in the program, a determination is made as to whether or not the engine crankshft arrives at the angular position set for the second point. For this determination, the central processing unit 91 looks at a counter which counts crankshaft position pulses C1 after the occurrence of a crankshaft reference pulse CA assigned to the corresponding cylinder. Assuming now that the particular engine is a four-cylinder engine, four crankshaft reference pulses CA occur in 720° of rotation of the engine crankshaft at a predetermined number of degrees before the top dead centers of the respective pistons. Thus, the counter starts counting crankshaft position pulses C1 after the occurrence of the crankshaft reference pulse subsequent to the crankshaft reference pulse which occurs at a predetermined number of degrees before the top dead center of the piston of the corresponding cylinder, as shown in FIG. 5.

If the determination at the point 414 is "yes", then the program proceeds to the point 416 where fuel injection is initiated from the particular fuel injector. The fuel injection continues until the engine crankshaft arrives at the angular position set for the first point. Following this, the program proceeds to the point 418 where the computer program is returned to the entry point 402 for the next cycle of execution of the computer program. If the determination at the point 414 is "no", then the program proceeds directly to the point 418.

Similar control is made for the other fuel injectors. According to the invention, the time at which fuel injection from a particular fuel injector to the corresponding cylinder is to be initiated is determined to ensure that the fuel injection will be terminated at a time variable according to the alcohole concentration of the fuel to be delivered to the engine. This is effective to have good air/fuel ratio control over the whole range of the alcohol concentration of the fuel.

What is claimed is:

1. An apparatus for controlling fuel delivery to an internal combustion engine having a plurality of cylinders each having an individual fuel injector, comprising:
   means sensitive to an alcohol concentration of the fuel to be delivered to the engine for producing an alcohol concentration signal indicative of a sensed alcohol concentration;

means sensitivie to engine speed for producing an engine speed signal indicative of a sensed engine speed;

means sensitive to engine load for producing an engine load signal indicative of a sensed engine load;

a control unit responsive to the alcohol concentration signal, the engine speed signal and the engine load signal for controlling the duration of fuel injection from each of the fuel injectors to the corresponding cylinder, the control unit including means for calculating a first time at which fuel injection to the corresponding cylinder is terminated, means for calculating a second time at which fuel injection to the corresponding cylinder is initiated to ensure that the fuel injection will be terminated at the first time, and means for varying the first time according to the alcohol concentration; and means coupled to the control unit for initiating fuel injection to the corresponding cylinder at the second time and terminating the fuel injection to the corresponding cylinder at the first time.

2. The apparatus as claimed in claim 1, wherein the control unit includes means for retarding the first time as the alcohol concentration increases.

3. The apparatus as claimed in claim 2, wherein the control unit includes means for comparing the alcohol concentration with a predetermined value, means for setting the first time to a first crankshaft angular position when the alcohol concentration is less than the predetermined value, and means for setting the first time to a second crankshaft angular position retarded with respect to the first crankshaft angular position when the alcohol concentration exceeds the predetermined value.

4. The apparatus as claimed in claim 3, wherein the control unit includes means for comparing the engine speed with a predetermined value, means for comparing the engine load with a predetermined value, means for setting the first time to the first crankshaft angular position without regard to the alcohol concentration when the engine speed is less than the predeterdmined value and when the engine load is less than the predetermined value.

* * * * *